May 1, 1934.   P. W. CRANE ET AL   1,956,564
METHOD OF PRODUCING PLASTIC SHEETING
Filed Sept. 30, 1930
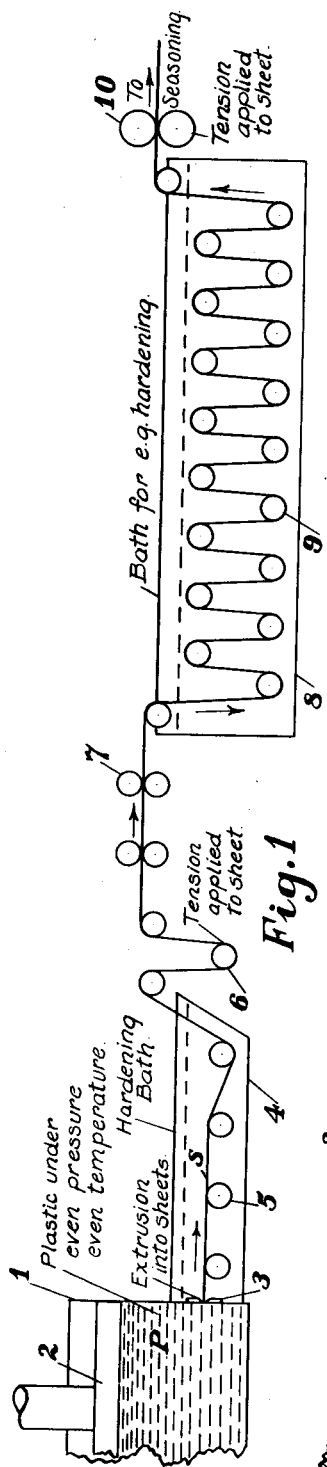
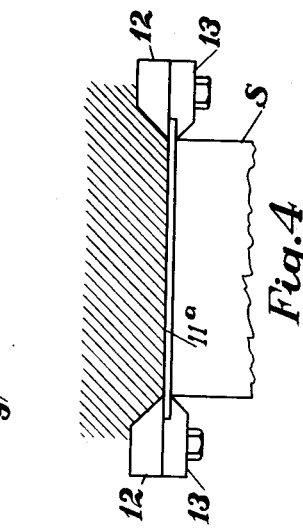
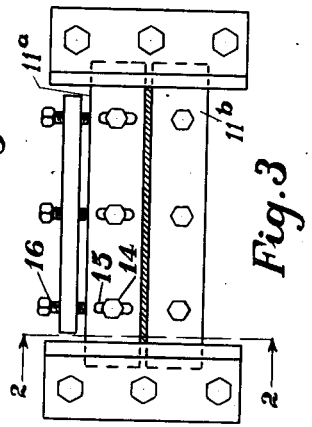
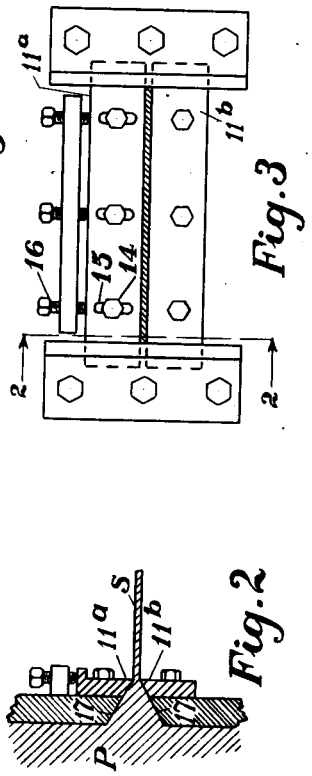
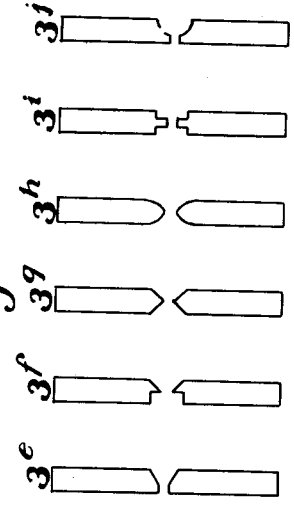
P. W. Crane
and
R. T. Fields
INVENTORS.
BY *Theodore S. Kingsbury*
Their ATTORNEY Patented May 1, 1934

1,956,564

UNITED STATES PATENT OFFICE 1,956,564

METHOD OF PRODUCING PLASTIC SHEETING

Paul W. Crane, Montclair, and Reuben T. Fields, Arlington, N. J., assignors to Du Pont Viscoloid Company, Wilmington, Del., a corporation of Delaware Application September 30, 1930, Serial No. 485,456

4 Claims. (Cl. 18—57)

This invention relates to the manufacture of carbohydrate-compound plastic sheeting, more particularly sheeting of cellulose ether, or ester, e. g. cellulose acetate or cellulose nitrate as a base, such sheeting being relatively thin, e. g. 0.003 to 0.035 inch thick (finished thickness). Plastic sheets are, of course, in general not new, it being old to manufacture them by the block process in which sheets are sheeted by a sheeter knife from a block of plastic, and by the casting process in which a dope is flowed on to a casting surface and solvents evaporated, as in the making of photographic film. However, prior methods have certain fundamental drawbacks, as regards the production of sheeting of suitable thickness, surface smoothness, clearness, freedom from dirt, etc. for certain important uses, such as the central strengthening plastic layer for safety glass. Thus, sheets from the block have knife marks which can be eliminated only with difficulty, if at all; cast sheets can be economically made only of, or below, a thickness of 0.0075 inch; and the stuffing process as ordinarily carried out and with relatively hard compositions would result in unsatisfactory sheets. We have devised a process by which plastic sheets of desired high quality and thickness (as for safety glass) can be expeditiously and satisfactorily made, and an apparatus whereby the same may be conveniently practiced.

One object of the invention is to provide a process for the manufacture of carbohydrate-compound plastic sheeting in desired thicknesses and of uniform high quality and thickness throughout the sheet. A further object is to provide a process whereby sheeting of desired characteristics can be produced expeditiously and at low cost. A further object is to provide an apparatus for the practice of such process. To these ends and also to improve generally upon processes and apparatus for the manufacture of plastic sheeting this invention consists in the various matters hereinafter described and claimed.

Without restricting the invention thereto the same is described in connection with the accompanying drawing in which Fig. 1 is a conventional, diagrammatic, elevational view of an apparatus assembly for the practice of the process; Fig. 2 is a section through the plastic and orifice substantially on line 2—2 of Fig. 3; Fig. 3 is a front view of the orifice; Fig. 4 is a plan view of the orifice with the plastic sheet emerging therethrough, the plastic in the container behind the orifice being shown in section; Fig. 5 is a diagrammatic view illustrating how the ends of the orifice may be increased in size in comparison to the major portion of the orifice in order to give the plastic sheet increased thickness along its side edges to increase the strength thereof against tearing if the sheet is drawn away from the orifice under tension; Fig. 6 is a series of somewhat diagrammatic sections taken through various orifices which may be used in the practice of the invention, the sections being comparable to a section taken on a line such as 2—2 in Fig. 3 but cross-hatching being omitted for simplicity.

In general conformity with the invention, a plastic composition of a controlled consistency, generally somewhat lower than that of compositions as mixed for the block process or the usual stuffing process, is forced through an orifice to form a sheet, the composition, orifice, speed and so forth being such that a more or less self-sustaining dough-sheet (as distinguished from a casting dope) is formed. This dough-sheet is then immersed in a hardening fluid to remove solvents, etc., the sheeting being preferably tensioned in the meantime. The result is a plastic sheet of uniform thickness and quality.

Thus, the plastic P may be processed in an apparatus such as conventionally illustrated in Fig. 1. Such apparatus comprises a container 1 for the plastic P, the container embodying means for applying pressure to the plastic, such as piston 2, and also embodying a slit-like orifice 3, through which the plastic is extruded. The illustrated apparatus further comprises a hardening unit (e. g. bath) 4 provided with supporting rollers 5 for the plastic sheet; a floating weighting roller 6 for applying tension to the sheet; driven rollers 7 for moving the sheet; a second bath or chamber 8 including carrying rollers 9; and driven tensioning rollers 10. As will be understood, the various units of the apparatus (including the orifice structure) may be equipped with provisions for controlling, maintaining and/or reducing the temperature, such as jackets, coils, and so on, as desired; showing of such items being omitted for simplicity. The treating fluids may be circulated through the various baths if desired, circulating connections being also omitted for simplicity.

In operation, the suitably heated plastic P is forced from the container 1 through the orifice 3 in the form of a semi-self-sustaining dough sheet S into the hardening bath 4 where the solvents are removed to a considerable extent, and the sheet consequently somewhat "case hardened" thereby increasing its self-sustaining character. From the bath 4 the sheet passes through the chamber 8 which may desirably contain a second hardening bath; and the sheet is then discharged from between the rollers 10, whereupon it may be cut into individual sheets of desired size, seasoned, etc. Proceeding now to a detailed description:—

The plastic composition P is made up with its ingredients mixed in such proportion that the compound will (after filtration) have the consistency desired for the formation of the sheet at the temperature to be used. The higher the temperature, the greater may be the consistency of the composition, although not necessarily. For manufacture at ordinary temperatures, say 20° C. to 90° C., the consistency may vary between that of a dough made by mixing together (by weight) pyroxylin of 800 centipoises (measured at 25° C. in a solution of 6% pyroxylin, 28.2% camphor, 65.7% of 95% ethyl alcohol by the falling sphere method, J. Ind. Eng. Chem. vol. 14 p. 1164) 24%; camphor 8%, 95% ethyl alcohol 68%, as a low limit of consistency, and the consistency of a dough made by mixing together (by weight) pyroxylin of 800 cps. (measured as above) 46%; camphor 16%; ethyl alcohol 38%, as a high limit of consistency. (It will be understood that these consistencies are standards for plastics in general, and not confined to use in determining the comparative consistency of only pyroxylin plastic.) These consistency limits are those of the given plastic compositions at 52° C.

The composition is desirably now filtered in the usual way of the art, by forcing the same at high pressure through a dense cloth, thus to remove any dirt or other extraneous matter. The filtration may be performed in such a way that the stock emerges from the filter into a chamber through which a stream of hot air is passed. If this is done, stock of a thinner initial consistency, than the low limit given above, which may be more readily filtered through a denser cloth and then concentrated by means of the hot air to the desired consistency above indicated for the formation of the sheet, may be used. While filtration is not essential to the process, it is recommended in order that products of the highest quality may result from the process.

The hot homogeneous filtered compound P is now introduced into the suitable container 1 and extruded through the orifice 3 under suitable pressure, as by the piston 2 or the pressure of an inert gas. The pressure used may vary between wide limits, and pressures between 30 to 400 pounds per square inch on the compound have been found satisfactory, when using a temperature range between 20° C. and 90° C. The rate of extrusion through the orifice will of course vary with the pressure, the temperature, and the consistency of the compound, rates from a few inches per minute to 30 feet per minute or more being satisfactory.

Upon emerging from the orifice 3 the plastic, in the form of a semi-self-supporting dough-sheet is preferably at once passed into the hardening bath 4 through which it is continuously passed under tension applied to the sheet by the regulated driven rollers 7 and the floating weighting roller 6. The tension on the sheet emerging from the orifice may be of any desired amount satisfactory to accomplish the desired results, and a tension of from 6 ounces to 20 pounds per square inch on the cross-sectional area of the sheet, has been found satisfactory. The use of tension on the sheet is desirable in order to hold it taut and thus prevent wrinkling of the sheet as a whole and in order to stretch the sheet slightly to overcome any tendency of the surfaces of the sheet to ripple. In the bath, the surface of the plastic "case hardens" to form a species of casing about the body of plastic to hold it in sheet form, as a self-sustaining body upon emerging from the bath.

The hardening bath may comprise various ingredients for the purpose of hardening the plastic by the removal of solvent, e. g. ethyl alcohol. The bath preferably includes a solvent-remover proper e. g. water, and also a material, e. g. glycerine, for preventing the precipitation of the base substance of the plastic, e. g. cellulose ester, and consequent blushing. Satisfactory hardening baths may be for example: methanol and water; glycerine and water; sodium chloride and water; sucrose and water; sucrose, water and methanol; and various others will suggest themselves to those skilled in the art in consideration of the results to be accomplished. The following baths have been found particularly satisfactory: (by weight) glycerine 70%, water 30%; a saturated water solution of sodium chloride; and (by weight) sucrose 50%, water 20%, methanol 30%.

The temperature of the hardening bath may be between from just above the freezing temperature thereof to 40° C. A relatively cold bath is desirable since subjection of the plastic to cold has, in itself, a hardening effect on the plastic, and furthermore counteracts blushing. Baths of dilute acids, such as sulphuric and phosphoric acids are suggested; and also baths of salts such as chlorides and sulphates of the alkali metals in water, and baths of dextrose and water.

Upon the passing of the plastic from the rollers 7, it is frequently of advantage to pass the sheet into a second hardening unit, as indicated at 8 in Fig. 1; although such a second unit need not necessarily be used. This hardening unit may embody a hardening bath of the general type indicated above or a current of warm air may be circulated through the container.

If it is found desirable to wash the plastic sheet, as to remove deposits from the surface thereof deposited thereon from the hardening bath (or baths) such a washing step may be introduced at any point in the progress of the sheet. Care should be taken that the surface of the sheet has attained a substantial degree of hardness prior to washing, thus to avoid excessive blushing. Thus a spray (e. g. water) may be introduced at any suitable point. Or in a case in which the plastic is subjected to but one hardening bath, as that in the container 4, the container 8 may contain a washing bath. The plastic is subjected to drying (e. g. seasoning) as in ordinary warm air drying chambers after its delivery from the manufacturing apparatus, as by the rollers 10, the continuous sheet permitting continuous drying if desired.

For producing sheets of uniform caliper and good surface it is highly desirable that the friction on the sheet during travel through the orifice be at a minimum, and this is effected by allowing the stock but a very short travel from the container to the functioning edges of the orifice. Also the edges of the orifice should be accurately ground and polished, and the functioning (sheet forming) edges of the orifice should be as thin through as is consistent with the pressure they must sustain (say 1/16" thick), and the opposed edges of the orifice should be straight and parallel to give uniform thickness to the sheet. By the edges being very smooth and narrow, the friction between the edges and the stock is at a minimum and will be the same across the entire width of the sheet. The distance between the edges forming the sheets may be fixed or adjustable.

The orifice structure conveniently comprises a mated pair of metal blades as 11a, 11b, which are clamped against supports 12—12 by the clamps 13—13, and are also held by the bolts 14. If desired, and as shown, one blade, as 11a, may be made adjustable with respect to the other by slots 15 for the bolts 14, and adjusting screws 16. As shown more particularly in Fig. 2 the edges 17—17 of the container 1 are contoured all across their width to form a wide approach to the edges of the blades 11a, 11b. While a structure providing for the adjustability of the orifice is preferable, it will be obvious that a non-adjustable orifice may be used if desired, in which case the blades 11a, 11b, may be (preferably removably) fixed to the container, or the container opening alone may serve as an orifice. While the container and the pressure applying means form no particular part of the present invention, it is noted that the provisions should be such that pressure be so exerted on the plastic that the same is under uniform pressure over the whole area of the orifice.

In certain cases it is desirable to strengthen the edges of the sheet against tearing, as in some cases where it is intended to exert a pull or tension on the sheet to draw it away from the orifice. Conveniently such strengthening may be done by increasing the thickness of the edges of the sheet. To this end, the edges of the blades may, at each end, be formed at an angle as illustrated in Fig. 5.

In Fig. 6 are illustrated various detailed orifices 3a to 3j, which are desirable for use. The showings are somewhat diagrammatic and may be taken as representing the orifice proper, whether the orifice be presented by the container wall alone, or a pair of blades. While, generally, the plastic would be passed through such orifices from right to left (in the drawing) all of the orifices illustrated may, if desired, be used by passing the plastic therethrough from left to right in the figure.

While the orifice is shown, and has been more particularly referred to, as so arranged that the plastic is discharged from the side of the container, it will be understood that it may, if found preferable, be located to discharge from other locations, as the bottom of the container. It is particularly advantageous to use with the illustrated type of orifice a compound of relatively low consistency from which sheets can be formed at rates of 10 feet or more per minute with moderate pressure (30 to 250 lbs. per square inch). The use of a thin compound reduces the friction at the orifice and forms a smoother, more even sheet in consequence. The lower pressures required to force out a compound of relatively low consistency permit the use of an orifice of less thickness and therefore of less resistance to the compound.

The following will serve as specific examples of the practice of the process, it being understood that they are illustrative merely, and are not given by way of limitation:—

(1)

A pyroxylin having a viscosity of 746 cps. was used. The viscosity was determined by the method previously referred to. For the plastic was used pyroxylin 10.7 kilograms, camphor 3.6 kilograms, mono-methyl-ether of ethylene glycol .940 kilograms, and 92% ethyl alcohol 14.1 kilograms; i. e. (percentages by weight) pyroxylin 36.4, camphor 12.3, mono-methyl-ethyl of ethylene glycol 3.2, and ethyl alcohol 48.1. These ingredients were mixed together in a closed mixer at 30° C. until a homogeneous mass was obtained. The mass was then filtered through a fine cloth at a pressure of 3000 pounds per square inch and a temperature of 75° C., into a closed container. From this container it was allowed to flow into a hydraulic press which forced it out horizontally at a pressure of 50 pounds per square inch and at a temperature of 54° C. through an adjustable orifice into a hardening bath at 9° C. containing 70% by weight of glycerine. The jaws of the orifice were set 0.034" apart. The extruded sheet was pulled away from the orifice under tension of 4 pounds per square inch through 6 feet of the bath. The sheets then passed to another like bath where the tension was increased to 10 pounds per square inch and was allowed to remain in this bath for 2½ hours. After that the stock was placed in a chamber through which air at 40° was circulated for 3 days. The rate of extrusion, and travel through the first bath, was 10 feet linear per minute. The temperature of the second bath was 18° C. The sheet was of exceptional smoothness, and practically without variations in caliper. The final caliper of the sheet was 0.020 inch after seasoning.

(2)

Pyroxylin of a viscosity of 746 cps. determined as above, was used. For the plastic was used pyroxylin 10.7 kilograms, camphor 3.6 kilograms, ethyl alcohol 5 kilograms, c. p. acetone 7.2 kilograms; i. e. percentages by weight, pyroxylin 40.4, camphor 13.6, ethyl alcohol 18.9, acetone 27.1. These ingredients were mixed together in a closed mixer at 30° C. until a homogeneous mass was obtained. The mass was then filtered through a fine cloth under a pressure of 2000 pounds per square inch at a temperature of 72° C. into a closed container. From the container it was allowed to flow into a hydraulic press which forced it out at a pressure of 47 pounds per square inch and at a temperature of 49° C. through an adjustable orifice into a hardening bath of saturated water solution of sodium chloride at 12° C. The opening of the orifice was set at 0.016". The tension on the emerging sheet was 4 pounds per square inch. The sheet travelled through 6 feet of the hardening bath and was then washed and placed in a chamber of air at 40° C. under a tension of 12 pounds per square inch for 6 days. The rate of extrusion, and travel through the bath, was 8 ft. linear per minute. The sheet was of exceptional smoothness, and practically without variation in caliper. The final caliper of the sheet was 0.010" after seasoning.

(3)

There was used a cellulose acetate plastic containing cellulose acetate 11.9 kilograms, triphenyl phosphate 2.0 kilograms, dimethyl phthalate 1.5 kilograms, ethyl acetate .7 kilograms and c. p. acetone 16 kilograms; i. e. percentages by weight, cellulose acetate 36.6, triphenyl phosphate 6.3, dimethyl phthalate 4.7, ethyl acetate 2.2, acetone 49.2. The ingredients were mixed in a closed mixer at 45° C. until a homogeneous mass was obtained. The compound was then filtered through a fine cloth at 1000 pounds pressure at 85° C. into a chamber through which a current of air of 60° C. was being passed. This process reduced the acetone content to 8.4 kilograms, or 34.3%, which yielded stock of the proper consistency for forming the sheet. The stock was then placed in a stuffing press and forced out through the orifice at 48 pounds per square inch at a temperature of 52° C. into a bath of a saturated water solution of sodium chloride at 11° C. The opening of the orifice was adjusted to 0.023". The tension on the emerging sheet was 4 pounds per square inch and the sheet was passed through 6 feet of the bath. It was then passed into a second like bath at 15° C. where the tension was increased to 10 pounds per square inch and the stock remained under tension in this bath for 2 hours. It was then removed and placed in a chamber, of hot circulating air for 2 days. The rate of extrusion, and travel through the first bath, was 14 linear feet per minute. The sheet was of exceptional smoothness and practically without variation in caliper. The final caliper of the sheet was 0.015" after seasoning.

(4)

There was used a benzyl cellulose plastic containing benzyl cellulose 10 kilograms, triphenyl phosphate 3 kilograms, ethyl acetate 1 kilogram and c. p. acetone 2 kilograms; i. e. percentages by weight, benzyl cellulose 62.5, triphenyl phosphate 18.75, ethyl acetate 6.25, acetone 12.5. The ingredients were mixed in a closed mixer at 50° C. until a homogeneous mass was obtained.

The mass was filtered through a coarse cloth under pressure of 5,000 pounds at 20° C. into a closed container. The filtered material was then placed in a hydraulic press and forced out the orifice at a pressure of 45 pounds per square inch and a temperature of 45° C. into a hardening bath of saturated water solution of sodium chloride salt at 15° C. The opening of the orifice was set at 0.022". The emerging sheet was pulled away from the orifice under a tension of 3 pounds per square inch through 6 feet of the hardening bath. The stock was washed free of hardening solution and placed in a seasoning vault of air at 35° C. for 7 days. The rate of extrusion, and travel through the bath, was 11 linear feet per minute. The sheet was of exceptional smoothness, and practically without variation in caliper. The final caliper of the stock was 0.018" after seasoning.

Example "1" was performed with an orfice 3.5 inches in width, and repeated with an orifice 11.5 inches in width. Examples "2", "3" and "4" were performed with an orifice 3.5 inches in width.

The sheeting produced by this process can be made with a smooth almost glassy surface which press polishes perfectly and may be readily laminated between glass plates for the production of non-shatterable glass. It does not contain the objectionable sheeter lines common to sheets made by the block process. The transparent sheeting is superior from a standpoint of clarity and dirt to that made from the same raw materials by the block process. Rough sheeting such as that used in making phonograph records by diepressing may be produced at approximately double the rate of smooth surfaced sheeting. The higher speed of production simply tends to roughen the surface and produce a sheet of more uneven caliper, which is, however, good enough for diepress work. The process can be used for the production of sheets of any desired width. Thus an orifice varying in length from 3 inches or less to 3 feet or more may be used, producing sheets of corresponding width.

While extrusion of plastic into a bath of liquid has been more particularly described, the invention is not limited to use of a liquid hardner, since sheets may in certain cases be satisfactorily produced by extrusion into a hardening gas, as air unsaturated with solvent. Among other plastics, this is the case with cellulose nitrate plastic and with cellulose acetate plastic; but it appears, we have found, that for equal smoothness of surface, cellulose acetate plastic of a given consistency can be extruded at a higher rate than cellulose nitrate plastic.

Both with cellulose acetate plastic and with cellulose nitrate plastic, if relatively thin sheets (e. g. not substantially over .010 inch seasoned thickness) are to be produced, the plastic can be extruded into air (preferably under tension as previously described) with highly satisfactory results as regards surface, etc., if the plastic be within the consistency and temperature ranges before indicated, and preferably, at the higher consistencies of the consistency range. For example:—

(5)

For the plastic was used, 11.7 kg. of cellulose acetate, 1.8 kg. triphenyl phosphate, 8.2 kg. acetone, and 0.7 kg. ethyl acetate; i. e. (percentages by weight) cellulose acetate 52.1, triphenyl phosphate 8.0, acetone 36.8 and ethyl acetate 3.1. These ingredients were mixed together in a closed mixer until a homogeneous mass was obtained. The mass was then filtered into a closed container through a cloth under a pressure of 5000 pounds per square inch at a temperature of 35° C. The filtered material was transferred to a hydraulic stuffing press where it was heated to 65° C. for 30 minutes.

It was then forced out through a suitable orifice, under a pressure of 150 pounds, into air at 30° C., at a rate of 10 feet per minute, tension being applied to the sheet. The sheets were seasoned in hot air for 5 days. The orifice setting was 0.010 inch. The final caliper of the seasoned sheet was 0.0075 inches and its width was 10 inches. The sheet was of excellent surface and caliper.

If, however, thicker sheets are to be made, it is desirable, for the best results, to use a consistency above the previously indicated range, say the consistency of a plastic such as (percentages by weight): pyroxylin (800 cps. determined as above) 49, camphor 16.6, alcohol 34.4; or (percentages by weight) (pyroxylin 745 cps. determined as above) 48.2, camphor 16.3, ethyl alcohol 22.6, methanol 8.7, mono-methyl ether of ethylene glycol 2.1 and ethyl acetate 2.1; or (percentages by weight) cellulose acetate 59., triphenyl phosphate 10., acetone 31., the consistencies of these three compositions being substantially the same. That is, the upper consistency for bath extrusion, is preferably used as about the low limit for air extrusion.

Pyroxylin compositions such as those just mentioned have been satisfactorily extruded into air at the rate of 1 foot per minute, through an orifice 3 inches in width and such an opening as would give a finished sheet of .020 inch thickness, and will give a surface smoothness equal to that of extruding compositions of 38% pyroxylin of the same viscosity into a hardening bath, through the same orifice at 10 feet per minute.

It is particularly emphasized that the plastic preferably throughout the mass in the container, but certainly at all portions immediately adjacent the orifice, be maintained at a uniform temperature. As previously indicated, it is highly desirable that the pressure on the plastic be uniform over the whole area of the orifice.

While it is preferable to discharge the plastic from the orifice directly and immediately into, and below the surface of, the hardening bath, as shown, in order to fix the plastic in sheet form as quickly as possible, it is evident that, if for any reason it be desired, there may be intermediate connections (or an air gap) between the orifice and the bath.

We claim:

1. That method of producing a continuous web of cellulosic derivative plastic which comprises heating a mass of cellulosic derivative composition, in the general character of a plastic mass as distinguished from a free-flowing solution such mass having a consistency substantially between that of a plastic of pyroxylin 24 percent, camphor 8 percent and ethyl alcohol 68 percent and that of a plastic of pyroxylin 46 percent, camphor 16 percent and ethyl alcohol 38 percent, to a temperature of at least about 54° C., thus to increase the mobility of the mass; continuously extruding the mass into web form while so heated; and at once immersing in a solvent removing liquid and cooling the mass to at least about 9° C., to stiffen the same and thereby increase the tensile strength thereof; and meanwhile applying a longitudinal pull of not less than substantially 4 pounds per square inch to the web to continuously remove it from the orifice as a smooth continuous web.

2. That method of producing a continuous web of cellulosic derivative plastic which comprises heating a mass of cellulosic-derivative plastic, in the general character of a plastic mass as distinguished from a free-flowing solution such mass having a consistency substantially between that of a plastic of pyroxylin 24 percent, camphor 8 percent and ethyl alcohol 68 percent and that of a plastic of pyroxylin 46 percent, camphor 16 percent and ethyl alcohol 38 percent, and continuously extruding the same through a slit-like orifice into a continuous web; and at once immersing the extruded web in a solvent-removing bath of a substantially saturated water solution of sodium chloride cooled to a temperature of at least about 15° C.

3. That method of producing a continuous web of cellulosic derivative plastic which comprises heating a mass of cellulosic derivative plastic, in the general character of a plastic mass as distinguished from a free-flowing solution, and continuously extruding the same through a slit-like orifice with its edges substantially straight and parallel to give substantially uniform thickness to the plastic as extruded; and at once subjecting the web as it is being continuously extruded to a solvent-removing liquid and to a temperature not exceeding about 15° C., thus to fix in the web, immediately upon its extrusion, the characteristics of smoothness and uniformity of thickness imparted thereto by the orifice.

4. That method of producing a continuous web of cellulosic derivative plastic which comprises heating a mass of cellulosic derivative plastic, in the general character of a plastic mass as distinguished from a free-flowing solution, and continuously extruding the same through a slit-like orifice with its edges substantially straight and parallel to give substantially uniform thickness to the plastic as extruded; and at once immersing the web as it is being continuously extruded in a solvent-removing liquid at a temperature in the neighborhood of 0° C., thus to fix in the web, immediately upon its extrusion, the characteristics of smoothness and uniformity of thickness imparted thereto by the orifice.

PAUL W. CRANE.
REUBEN T. FIELDS.